United States Patent [19]
Kastner

[11] Patent Number: 5,337,852
[45] Date of Patent: Aug. 16, 1994

[54] COUPLING FOR INTERCONNECTING HOOD WITH A VEHICLE COMPONENT AND FOR DISCONNECTING A VEHICLE ELECTRIC CIRCUIT DURING A COLLISION

[75] Inventor: Michael Kastner, Wolfsburg, Fed. Rep. of Germany

[73] Assignee: Volkswagen AG, Wolfsburg

[21] Appl. No.: 5,894

[22] Filed: Jan. 15, 1993

[30] Foreign Application Priority Data

Feb. 19, 1992 [DE] Fed. Rep. of Germany ....... 4204964

[51] Int. Cl.⁵ .............................................. B62D 25/12
[52] U.S. Cl. ..................... 180/274; 180/69.2
[58] Field of Search .......... 180/69.2, 69.21, 271, 180/274, 277, 279, 273

[56] References Cited

U.S. PATENT DOCUMENTS

| | | | |
|---|---|---|---|
| 3,498,282 | 3/1970 | Dattilo | 180/279 |
| 3,643,756 | 2/1972 | Soreghy | 180/271 |
| 3,754,614 | 8/1973 | Habas | 180/69.21 |
| 4,012,807 | 3/1977 | Kern | 180/69.2 |
| 4,058,182 | 11/1977 | Huber | 180/274 |
| 4,181,192 | 1/1980 | Danckert | 180/291 |
| 4,753,475 | 6/1988 | Mochida | 180/69.21 |

FOREIGN PATENT DOCUMENTS

| | | |
|---|---|---|
| 2043114 | 5/1972 | Fed. Rep. of Germany . |
| 4000904 | 7/1990 | Fed. Rep. of Germany . |
| 59-6174 | 1/1984 | Japan ................................. 180/69.2 |

Primary Examiner—Karin L. Tyson
Attorney, Agent, or Firm—Brumbaugh, Graves, Donohue & Raymond

[57] ABSTRACT

In a motor vehicle end zone provided with deformation elements, a coupling is provided between a component of vehicle equipment disposed within a compartment and a portion of a hood for the compartment so that when the hood portion moves upwardly during a collision, the component in the compartment is raised away from other components in the compartment. In one embodiment, an electrical circuit is disabled by relative motion of the hood portion.

4 Claims, 3 Drawing Sheets

COUPLING FOR INTERCONNECTING HOOD WITH A VEHICLE COMPONENT AND FOR DISCONNECTING A VEHICLE ELECTRIC CIRCUIT DURING A COLLISION

BACKGROUND OF THE INVENTION

This invention relates to front- and rear-end compartments for motor vehicles arranged to absorb kinetic energy in a collision.

In a preferred application of the invention, an end compartment of a motor vehicle constitutes the engine compartment of the vehicle, accommodating other operating equipment besides the engine, for example, a battery, a control unit, a main brake cylinder with a brake power-assist unit and other accessories. The invention is also applicable to vehicle end compartments containing operating equipment other than the engine which, like the operating equipment in the engine compartment, substantially fills the compartment in the longitudinal direction of the vehicle.

If deformation members are provided for kinetic energy conversion in the case of a collision, such a closely-packed arrangement of operating equipment in a related end compartment limits the deformation displacement of the deformation members so that they cannot be completely utilized for energy conversion because the operating equipment will pile up. As a result, the occupants will be subjected to dangerously high decelerations.

SUMMARY OF THE INVENTION

Accordingly, it is an object of the present invention to provide a motor vehicle end compartment which overcomes the disadvantages of the prior art.

Another object of the invention is also to provide such a motor vehicle front- or rear-end compartment in a simple and inexpensive way while assuring a large deformation displacement despite close packing of the compartment with operating equipment.

These and other objects of the invention are attained by providing a motor vehicle having deformation members and an associated end compartment with a compartment hood portion arranged to move upwardly in response to deformation in the longitudinal direction of the vehicle and a connecting member on the hood portion arranged to move into engagement with equipment in the compartment when the hood portion is deformed.

According to the invention, therefore, collision-related relative movements between the hood and individual equipment components in the compartment are utilized to lift those components out of the interior of the compartment and thereby prevent the deformation of the end of the motor vehicle from being blocked by a pile-up of equipment.

In another aspect of the invention, collision-related relative motion between the hood and equipment in a compartment may initiate other safety measures such as by operation of a switch. In the case of a collision, it is known that there is always a danger of fire in the vehicle due to sparks or a short circuit. This danger increases if the fuel pump continues to deliver fuel after collision-related leakage of fuel lines. According to this aspect of the invention, this problem is averted by utilizing collision-related relative motion between the hood and a switch arranged in the compartment for an electrical circuit, such as a fuel pump circuit, to open the switch by way of a connection between hood and switch that becomes operative in response to such relative motion, thus disconnecting the circuit in question.

Such connections may be provided in various ways. For example, they may be hook-and-eye connections which enter into mutual engagement only during relative motion between the hood and a component in the compartment. Likewise conceivable are connections produced by inertia effects during the collision and, also, connections which are kinetically coupled to a hood latch so that they will always occur when the hood is closed.

Regardless of the particular arrangement of these connections, they always have the result that the upward motion of a hood portion will lift a component in the compartment away from other components.

In this connection, it should be noted that German Patent No. 2 043 114 and German Offenlegungsschrift No. 40 00 904 demonstrate that it is well known that hoods not only tend in general to bulge upward in the event of a collision, but that this mechanism of deformation can be deliberately controlled.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
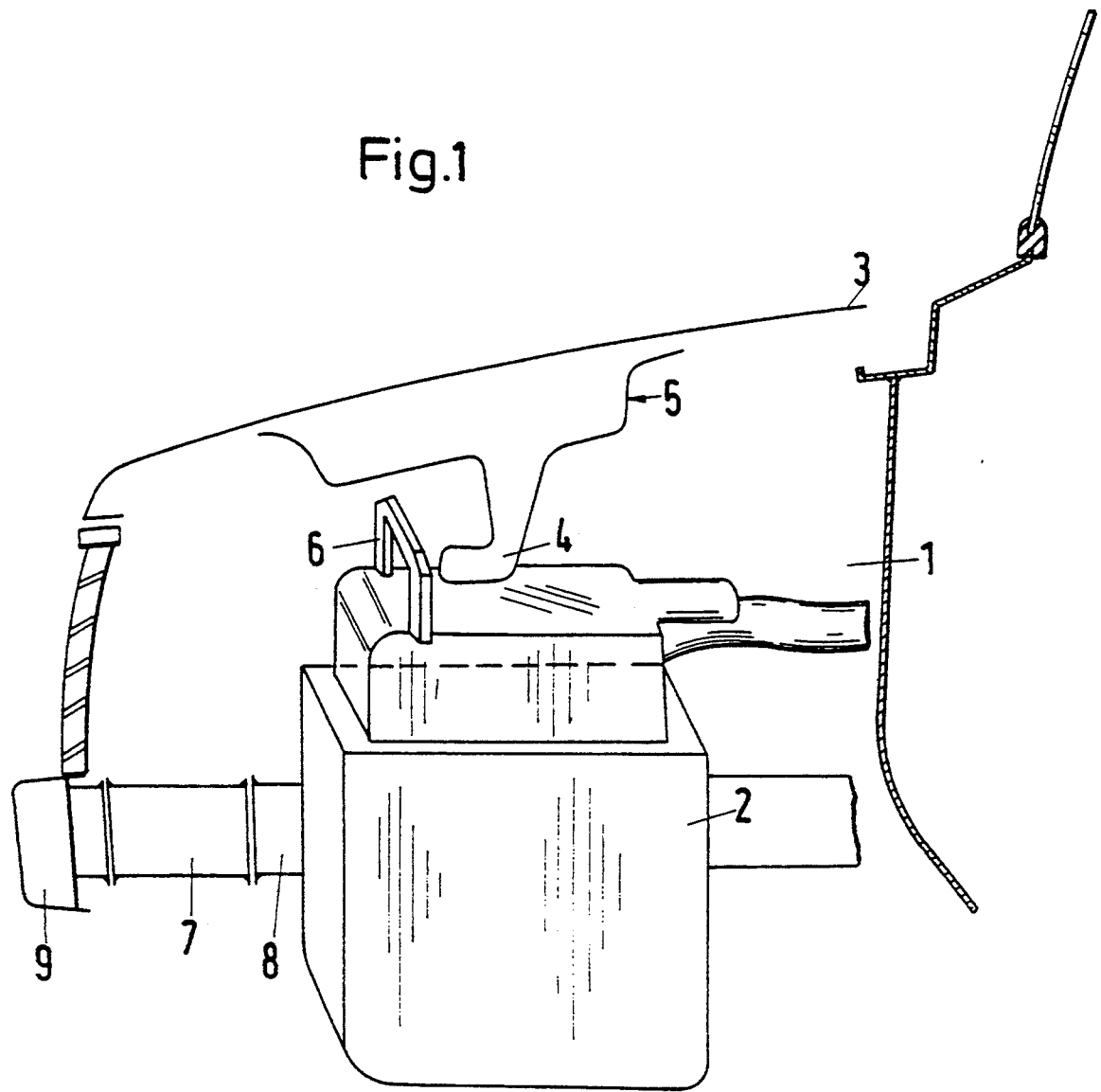
FIG. 1 is a schematic perspective fragmentary view showing a portion of a typical vehicle end compartment arranged in accordance with one embodiment of the invention.

Several embodiments of the invention will be described hereinafter with reference to the drawings by way of example. The figures in the drawings show only the parts of interest in this context. Thus, illustration of details of the deformation members associated with the vehicle end compartments is omitted since, in the first place, they are very well known to those skilled in the art and, in the second place, their particular configuration does not constitute a part of the invention.

In the representative embodiment shown in FIG. 1, an electronic control unit 2 for the engine of a vehicle is mounted in an engine compartment 1 along with other vehicle equipment components (not shown) so as to be movable upward on application of a preassigned force. The engine compartment 1 contains deformation elements 7 in front of longitudinal side sills 8 and behind bumper 9 and is covered by a hood 3 which, in this embodiment, has an inner sheet metal part 5 providing a catch hook 4. In the absence of a collision, the hook 4 faces a loop 6 arranged on the control unit 2 in spaced relation in the lengthwise direction of the vehicle. The hook 4 and the loop 6 are disposed so that they will not enter into engagement in normal operation of the vehicle and, accordingly, the hood 3 can be raised or otherwise opened without affecting the position of the control unit 2. But, as soon as the support for the control unit 2 is moved towards the passenger compartment, i.e., to the right as viewed in FIG. 1, because of a collision-related deformation of the deformation elements associated with the compartment 1, the loop 6 will engage the hook 5, providing a coupling arrangement so that, upon ensuing deformation of the hood 3, the control unit will be lifted or pulled upwardly out away from the other components accommodated in the engine compartment 1 by upward motion of the hood region supporting the hook 4. As a result, sufficient space will remain between the components remaining in the engine compartment 1 to ensure complete deformation displacement of the deformation elements associated with the compartment.

Figure 2:
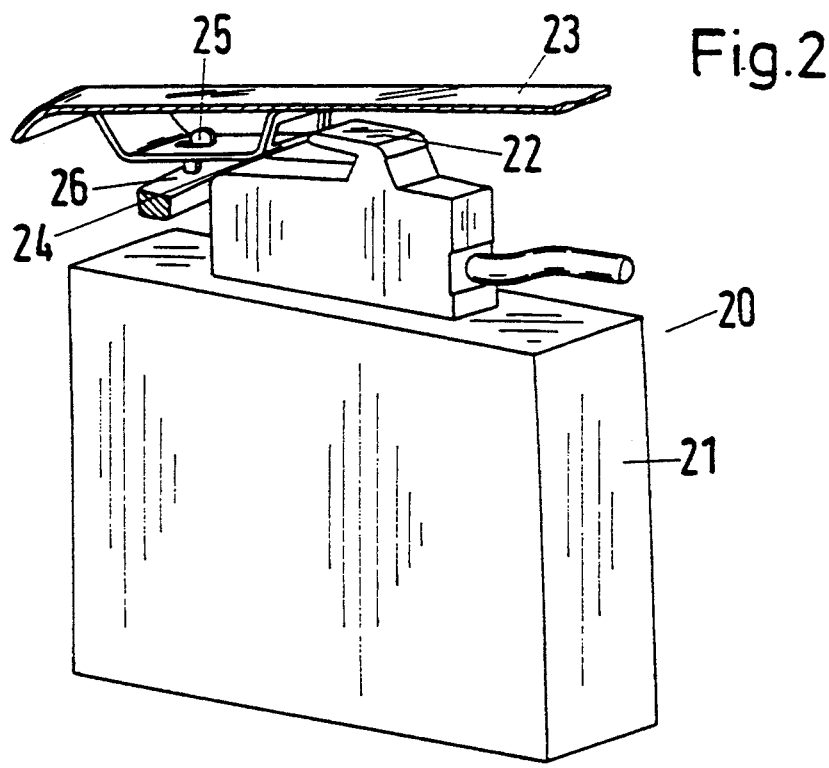
FIG. 2 is a schematic perspective fragmentary view showing a portion of a typical vehicle end compartment arranged in accordance with another embodiment of the invention.

The typical embodiment shown in FIG. 2 differs from that of FIG. 1 in that the vehicle structure is arranged so that, in the event of a collision, there will first be a hood deformation prior to deformation of the associated deformation elements, and in that a control unit 21 in an engine compartment 20 is provided with a catch hook 22, and a hood portion 23 is provided with a matching loop 24. Here again, the two connecting parts 22 and 24 face each other in spaced relation in the lengthwise direction of the vehicle during normal vehicle operation so that they will not be engaged until a collision occurs. When the hood 23 is deformed during a collision, the coupling of the hook 22 and the loop 24 will be estabilshed prior to deformation of the associated deformation members so that the control unit 21 will then be raised away from other equipment components in the compartment 20. The catch hook 22 in this embodiment forms part of a hood latch comprising a slot in the front side of catch hook 22 receiving a latch hook 25 pivotally borne by a laterally extending cross arm 26 of the engine compartment.

Figure 3:
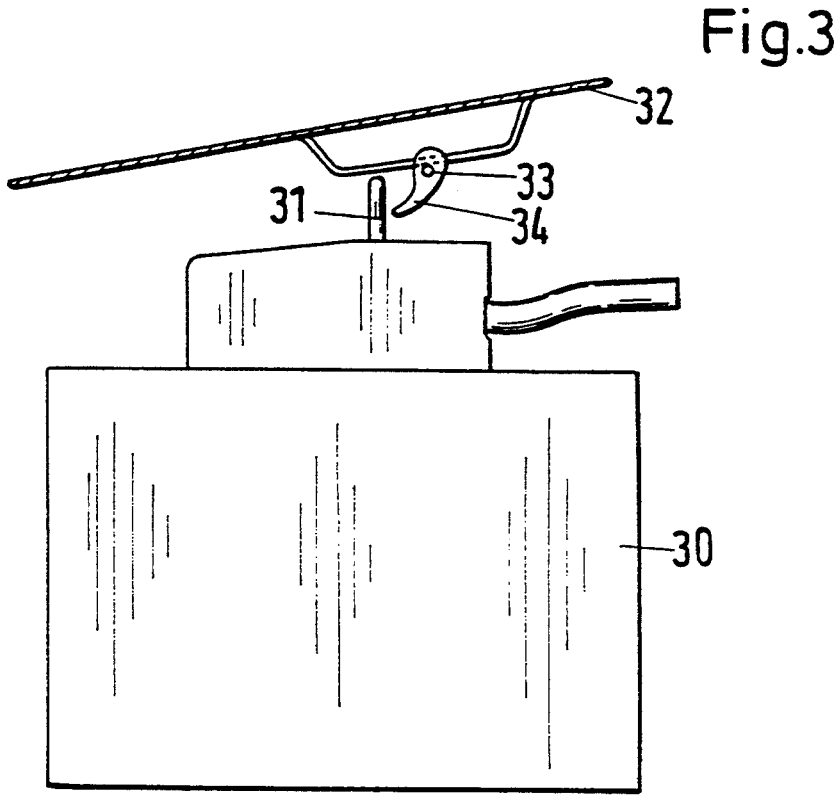
FIG. 3 is a schematic fragmentary side view showing a portion of a typical vehicle end compartment arranged in accordance with a further embodiment of the invention.

The embodiment shown in FIG. 3 operates in a different manner. Here again, the component to be raised is assumed to be a control unit 30 having a loop 31 provided on its uper portion. A hook 34 is pivotally supported from the hood 32 by a pivot 33. The shaft 33 is coupled to a conventional hood latch (not shown) for the hood 32 so that, when the hood latch has been actuated to retain the hood 32 in closed position, the hook 34 engages the loop 31 and so establishes the coupling between the hood 32 and the control unit 30 before any collision occurs and, when the hood latch is released, the hook 34 is withdrawn from the loop 31. As in the other embodiments, when the portion of the hood 32 carrying the hook 34 bulges upwardly, the control unit 30 is lifted out of the engine compartment in a collision.

Figure 4:
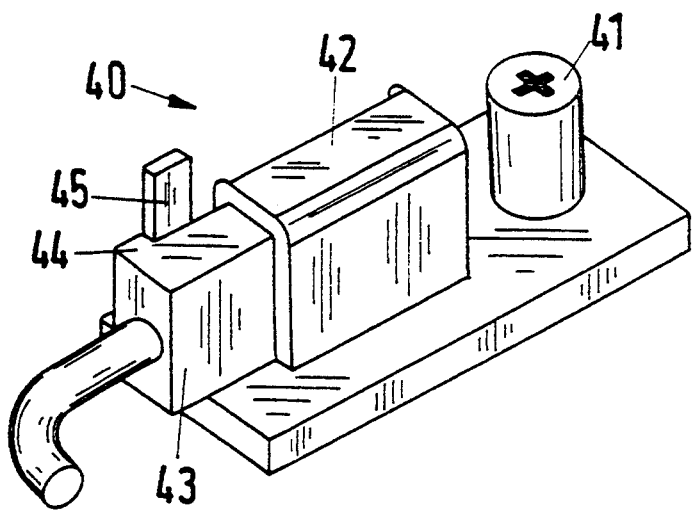
FIG. 4 is a schematic perspective view illustrating a representative electric circuit disconnect arrangement for use in a motor vehicle end compartment in accordance with another embodiment of the invention.

FIG. 4 shows another embodiment providing a detachable battery terminal. The operative component is a switch 40, consisting of a receptacle 42 arranged on a battery terminal 41 and a contact 43. A finger 44 is arranged on the contact 43 so that, upon relative motion of the switch 40 with respect to a hood-anchored stop 45, the two switch parts 42 and 43 will separate, breaking the circuit. This relative motion is arranged so that the switch 40 will be opened before the deformation of the deformation elements (and hence displacement of the battery) occurs.

Figure 5:
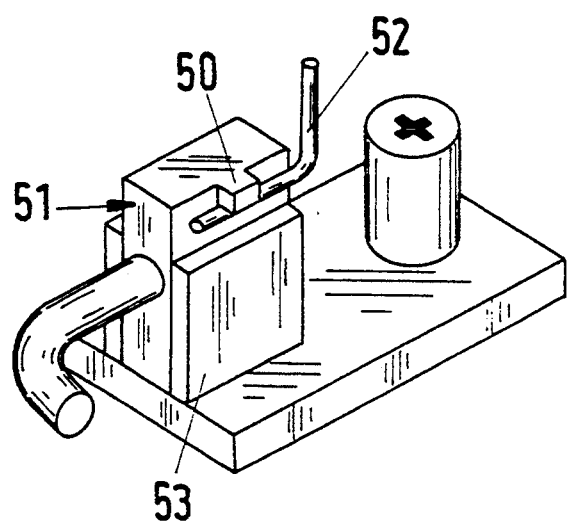
FIG. 5 is a schematic perspective view illustrating another form of a representative electric circuit disconnect arrangement for use in a motor vehicle end compartment arranged according to the invention.

The embodiment shown in FIG. 5 differs from that of FIG. 4 in that a finger 50 projects from a contact 51 to be engaged by a hook-like member 52 mounted on a part of the hood and be pulled upwardly out of the compartment 53 as that part of the hood moves upwardly during a collision.

The invention thus provides a motor vehicle front- or rear-end compartment that utilizes relative motion between components in a compartment on the one hand and a hood covering the components on the other hand to avoid collision-related problems.

Although the invention has been described herein with reference to specific embodiments, many modifications and variations therein will readily occur to those skilled in the art. Accordingly, all such variations and modifications are included within the intended scope of the invention.

I claim:

1. An end compartment for a motor vehicle for holding components of operating equipment for the vehicle and associated with one or more deformation elements to convert kinetic energy into work of deformation in the event of a collision comprising a hood covering at least a portion of the compartment including at least one hood region that will move upwardly as a result of hood deformation and a coupling arrangement between the hood portion and at least one of the components in the compartment arranged to engage and raise the component during a collision.

2. An end compartment according to claim 1 wherein the coupling is kinetically coupled to a hood latch.

3. An end compartment according to claim 1 wherein the coupling comprises complementary connecting means on the hood and on the component arranged to come into engagement only after relative motion between the component and the hood resulting from deformation of deformation elements associated with the compartment.

4. A motor vehicle end compartment for holding components of operating equipment for the vehicle comprising deformation elements arranged to convert kinetic energy into deformation work in the event of a collision, a hood covering at least a portion of the compartment and having at least one hood region which will move with respect to the compartment during a collision, and a coupling for engaging the hood portion and the component, wherein at least one of the components is a switch for an electric circuit which is disconnected during a collision as a result of the coupling.

* * * * *